(12) United States Patent
Schuck et al.

(10) Patent No.: US 7,542,206 B2
(45) Date of Patent: Jun. 2, 2009

(54) LIGHT COLLECTORS FOR PROJECTION SYSTEMS

(75) Inventors: Miller H. Schuck, Boulder, CO (US); Michael G. Robinson, Boulder, CO (US)

(73) Assignee: Real D, Beverly Hills, CA (US)

( * ) Notice: Subject to any disclaimer, the term of this patent is extended or adjusted under 35 U.S.C. 154(b) by 0 days.

(21) Appl. No.: 11/779,711

(22) Filed: Jul. 18, 2007

(65) Prior Publication Data

US 2008/0018999 A1    Jan. 24, 2008

Related U.S. Application Data

(60) Provisional application No. 60/807,704, filed on Jul. 18, 2006, provisional application No. 60/829,495, filed on Oct. 13, 2006, provisional application No. 60/862,414, filed on Oct. 20, 2006.

(51) Int. Cl.
*G02B 5/30* (2006.01)
*G02B 6/00* (2006.01)
*G02B 27/28* (2006.01)

(52) U.S. Cl. ............... 359/495; 359/496; 359/497; 359/502; 362/19; 362/551; 362/583; 353/20; 385/36

(58) Field of Classification Search ........ 359/495, 359/497, 496, 502; 362/19, 551, 583; 353/20; 385/11, 36
See application file for complete search history.

(56) References Cited

U.S. PATENT DOCUMENTS 5,223,975 A * 6/1993 Naganuma et al. ......... 359/487
5,382,790 A * 1/1995 Robillard et al. ........... 250/216
5,513,023 A * 4/1996 Fritz et al. .................. 349/9
6,132,047 A * 10/2000 Itoh ........................... 353/20
6,384,972 B1 * 5/2002 Chuang ...................... 359/495
6,726,329 B2 * 4/2004 Li et al. ...................... 353/20
6,937,377 B1 * 8/2005 Brown et al. ................ 359/237
7,325,957 B2 * 2/2008 Morejon et al. ............. 362/555
2005/0200812 A1 * 9/2005 Sakata et al. ................ 353/20
2005/0259224 A1 * 11/2005 Lee et al. .................... 353/31
2006/0007538 A1 * 1/2006 Robinson .................... 359/494

OTHER PUBLICATIONS

International search report and written opinion of international searching authority in co-pending PCT application No. PCT/US07/73809 mailed Sep. 24, 2008.

* cited by examiner

*Primary Examiner*—Ricky D Shafer
(74) *Attorney, Agent, or Firm*—Baker & McKenzie LLP

(57) ABSTRACT

Disclosed herein are light collectors for use in projection applications. The light collectors gather light from surface emitting sources (e.g., LEDs) of differing color (or same color in some embodiments) using input lightpipes. A light collection system splits the light into orthogonal linear polarization states and efficiently propagates the light by using polarizing beamsplitters (PBSs) and a reflecting element to recycle light at a port of the PBS. Further, the light collection system may efficiently homogenize the light using an output lightpipe in a lightpath from the outputs of the PBSs. In addition, the light collection system may present a single, linear polarization at the output through the use of a half-wave switch (LC cell) in some embodiments or ColorSelect filter in other embodiments. The light collection system may be integrated into a single, monolithic glass, plastic or combination glass/plastic assembly.

19 Claims, 10 Drawing Sheets

X-Z PLANE

Y-Z PLANE

LIGHT COLLECTORS FOR PROJECTION SYSTEMS

CROSS-REFERENCE TO RELATED APPLICATIONS

This Application claims priority to commonly-assigned provisional patent application Ser. Nos.: (1) 60/807,704, entitled "Lightpipe for projection systems," filed Jul. 18, 2006; (2) 60/829,495, entitled "Non-imaging collector for polarized, multi-primary illumination system," filed Oct. 13, 2006; and (3) 60/862,414, entitled "Light collectors for projection systems," filed Oct. 20, 2006, all of which are herein incorporated by reference.

This Application relates to commonly-assigned U.S. application Ser. No. 11/779,706, entitled "Light Collectors for Projection Systems," filed Jul. 18, 2007; and also relates to commonly-assigned U.S. application Ser. No. 11/779,704, entitled "Light Collectors for Projection Systems," filed Jul. 18, 2007.

TECHNICAL FIELD

This disclosure generally relates to a light collection system, and more specifically relates to a non-imaging collector for a projection system.

BACKGROUND

Étendue is a property of an optical system. It is given by the cross-sectional area of a cone of light (in the plane perpendicular to the propagation direction), times the solid angle subtended by the light. Other names for this property are acceptance, throughput, light-grasp, collecting power, and the $A\Omega$ product. Étendue is important because it never increases in any optical system. A perfect optical system produces an image with the same étendue as the source.

The importance of étendue is in determining optical system throughput. Any given source emits light into an optical system with efficiency dependent on the system étendue. Most surface emitting light sources (e.g., light emitting diodes) do not match the étendue required of projection panels. The die are either too small, requiring the addition of die, or too large, requiring some sort of aperture to reduce the LED étendue to match the panel étendue.

Given the aforementioned shortcomings, it would be desirable to match LED die to panel étendue in order to maximize optical system throughput.

SUMMARY

Disclosed herein are light collectors for use in projection applications. In an embodiment, an apparatus for a projection system includes first and second lightpipes, a first and second PBS, a quarter-wave plate, and a reflecting element. The first and second lightpipes are respectively operable to receive light from first and second light sources. The first PBS has a first input port, a first polarization manipulating port, and a first output port, where the first input port is optically coupled to the first lightpipe. The second PBS has a second input port, a second polarization manipulating port, and a second output port, where the second input port is optically coupled to the second lightpipe. The quarter-wave plate is adjacent the first and second polarization manipulating ports and the reflecting element is adjacent the quarter-wave plate. The output light pipe is operable to collect light from the first and second output ports.

In a variation of this embodiment, the apparatus may further include a ColorSelect filter located in a light path exiting the output lightpipe, where the ColorSelect filter is operable to polarize an additive color spectrum along a first axis and its compliment color spectrum along a second axis. In such an embodiment the first light source may provide an additive color spectrum, while the second light source may provide a complementary color spectrum.

In yet another variation on this embodiment, the apparatus may further include (instead of the ColorSelect filter) a switchable half-wave rotator located in a light path exiting the output lightpipe. In such an embodiment, the first and second light sources may be the same color, with the first and second light sources being temporally modulated to alternately provide a periodic high-intensity output.

Others features and embodiments are shown herein with reference to the drawings, detailed description, and appended claims.

DETAILED DESCRIPTION

Disclosed herein are light source combining devices for use in projection applications. In accordance with the foregoing, it is desirable to match the output of the surface emitting light sources (e.g., LEDs) to light modulating panels of the projection systems. Generally, the light source combining devices may provide a linearly polarized, spatially uniform output with well defined output area and distribution angles to an LCOS, DLP or LCD modulating panel. By use of multi-primary light sources, the illuminator provides higher luminous output into a given étendue.

Figure 1:
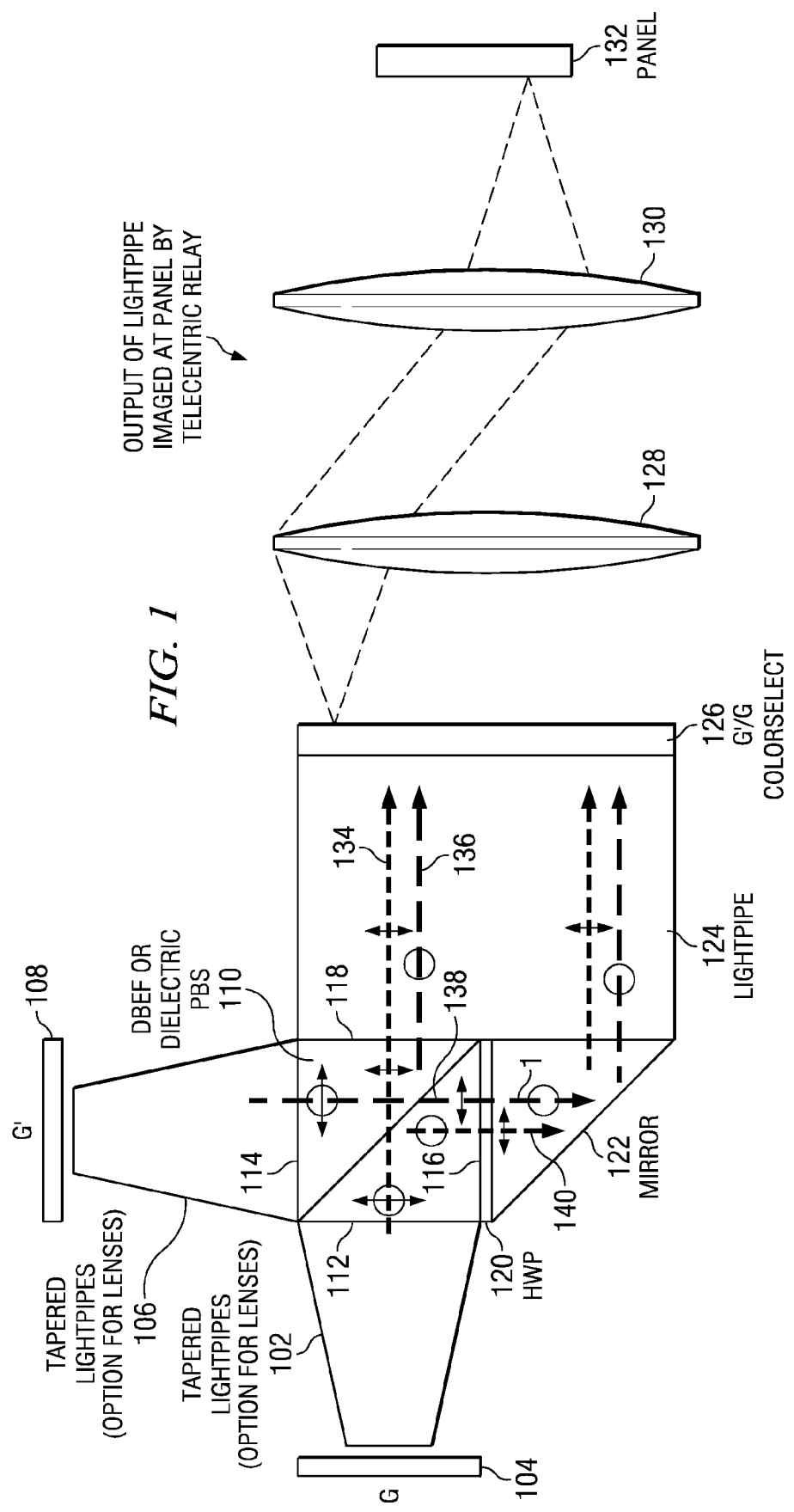
FIG. 1 is a schematic diagram of a first embodiment of a light collection system in accordance with the present disclosure.

FIG. 1 is a schematic diagram of a first embodiment of a light collection system 100. Light collection system 100 includes tapered lightpipes 102, 106, a polarization beam splitter (PBS) 110, a polarization rotation element 120, a reflecting element 122, an output lightpipe 124, and a G'/G ColorSelect® filter 126, arranged as shown.

The first tapered lightpipe 102 is optically coupled to a first input port 112 of the PBS 110, which may be a PBS having a multilayer birefringent structure (e.g. a Vikuiti™ PBS, as provided by 3M, Corp.), a dielectric PBS, or the like. A second tapered lightpipe 106 is optically coupled to a second input port 114 of the PBS 110. First light source G 104 and second light source G' 108 may be provided by surface emitting color sources such as light emitting diodes (LEDs). Light sources 104, 108 are optically coupled to input ports of respective tapered lightpipes 102, 106. A polarization rotation element 120 may be provided by a halfwave plate (HWP), located at a first output port 116 of the PBS 110. Polarization rotation element 120 serves to transform the state of polarization from p-polarized light to s-polarized light, and vice versa. In some embodiments, polarization rotation element 120 may be provided by a film. A reflecting element 122 may be optically coupled to the polarization rotation element 120, and an output lightpipe 124 may be optically coupled to the second output port 118 of the PBS 110 and the reflecting element 122 to collect light therefrom. Although in this embodiment, the polarization rotation element 120 is located between the output port 116 and reflecting element 122, in other embodiments it could instead be located between the reflecting element 122 and the output lightpipe 124.

The G'/G ColorSelect filter 126 is located in the lightpath of exiting light from output lightpipe 124. As used herein, G'/G ColorSelect® filter 126 is used as an exemplary filter for colors G and G', as output by light sources 104 and 108 respectively. ColorSelect filters are manufactured by ColorLink, Inc., located in Boulder, Colo., and utilize retarder stacks to rotate the state of polarization of an additive color band (e.g., color G) by 90°, while the complementary color band (e.g., color G') retains the input state of polarization. Examples of G'/G configurations include but are not limited to Green/Magenta, Red/Cyan, and Blue/Yellow. Such filters are described in commonly-assigned U.S. Pat. Nos. 5,751,384 & 5,953,083 to Gary D. Sharp, which are herein incorporated by reference. A linear cleanup polarizer (not shown) may also be located in the light path following the G'/G ColorSelect® filter 126 to provide more uniform polarized output light. Lenses 128 and 130 may be configured as a telecentric relay system to direct output light to an LCOS, DLP, or LCD modulating panel 132. It should be appreciated that other embodiments, some of which are provided herein, may provide alternative imaging or relay optical networks to direct light toward panel 132.

In operation, light from distinctly different surface emitting color sources 104 and 108 (labeled G and G' in this case; note their spectral regions may overlap in some embodiments) is collected and transmitted toward the first and second input ports (112 and 114) of the PBS 110. Generally, s-polarized light from each source 104 and 108 is reflected by the PBS 110, while p-polarized light is transmitted. For instance, the G' p-polarized light 138 and G s-polarized light 140 propagates toward the polarization rotation element 120 at the first output port 116, where they are both rotated 90 degrees to s-polarized and p-polarized light respectively. Reflecting element 122 then reflects the light from the polarization rotation element 120 toward lightpipe 124. G p-polarized light 134 and G' s-polarized light 136 propagates toward the second output port 118.

Thus, as shown by this exemplary embodiment, all G light enters the output lightpipe with p-polarization and all G' light enters with s-polarized light. The output lightpipe may homogenize the spatial distribution of both G and G' light independently (with some loss in polarization purity), and effectively eliminates the edge effect that may be caused by a HWP 120. The G and G' light then passes through a G'/G ColorSelect filter 126, which rotates the G' light 90 degrees and does not rotate the G light. The output is a uniform mixture of p-polarized G and G' light that can be imaged with relay optics to a panel. A linear polarizer (not shown) may be placed after the ColorSelect filter for polarization cleanup. Outputting light with one common polarization may be particularly useful for applications that utilize liquid crystal panels to modulate light, but may be less desirable for projection applications utilizing micromirrors to modulate light (i.e., DLP techniques).

Figure 2:
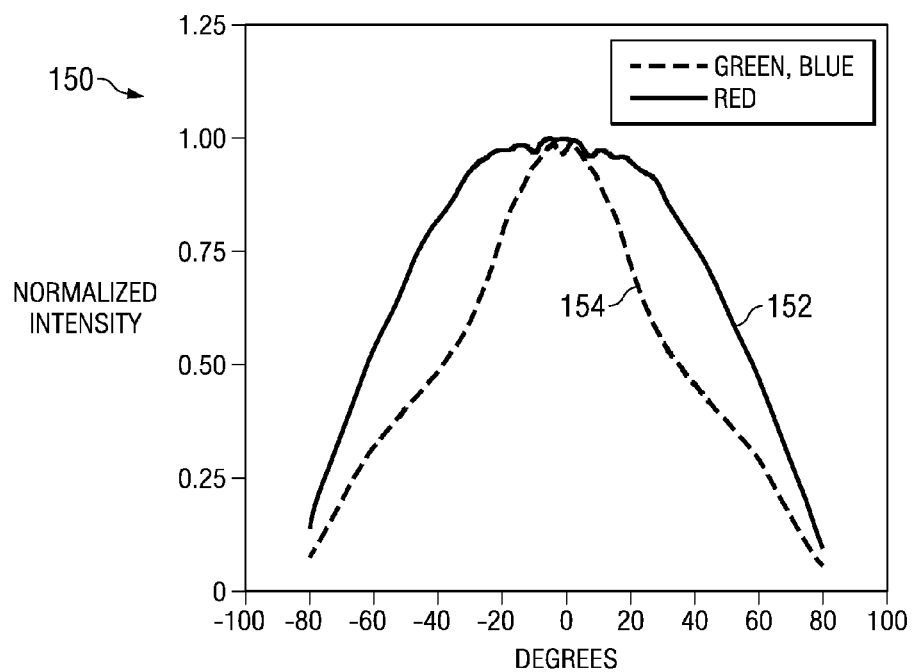
FIG. 2 is a graph illustrating angular intensity distribution in the far field for exemplary red, green, and blue Light Emitting Diode (LED) devices in accordance with the present disclosure.

FIG. 2 provides a graph 150 illustrating angular intensity distribution in the far field for exemplary high-power red, green, and blue LED devices (in this case, from Luminus Devices). From the graph 150, it may be observed that the intensity of each of the red, green, and blue devices is not uniform with angle. Furthermore, the red device (as shown by line 152) has a nearly Lambertian normalized intensity profile, while the blue and green devices (shown by line 154) have a more peaked normalized intensity profile.

Figure 3A:
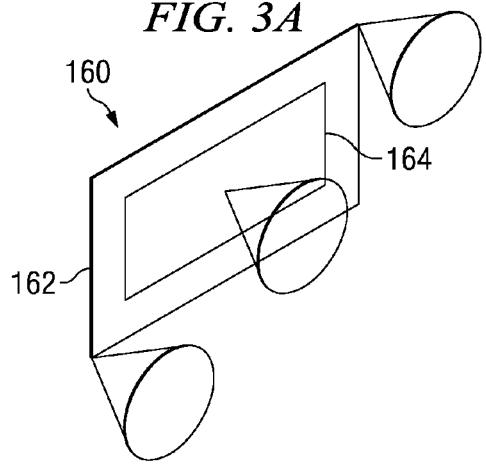
FIG. 3A is a schematic diagram illustrating the relationship of luminous output to the aperture die area of an LED in accordance with the present disclosure.
Figure 3B:
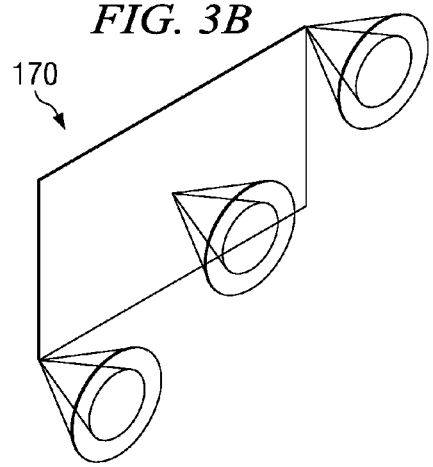
FIG. 3B is a schematic diagram illustrating the relationship of luminous output to the aperture angular output of an LED in accordance with the present disclosure.

Most LED products do not exactly match the étendue required of projection panels. The die are either too small (requiring the addition of die) or too large, requiring some sort of aperture to reduce the LED étendue to match the panel étendue. FIGS. 3A and 3B illustrate two techniques for reducing étendue at LEDs 160 and 170 respectively. The first technique involves varying the aperture 164 at the die 162.

Since the die 162 can be thought of as a surface with an infinite number of point emitters, a reduction in die area produces a proportional reduction in luminous output. The second technique for reducing étendue, as illustrated by LED 170 in FIG. 3B, involves varying collected angular output. However, given the non-uniform nature of emitters' angular distribution, a reduction in angular output will produce a higher luminous output for the same reduced étendue. Note that in comparison to the first technique, the second technique may result in a lower loss in luminous output for 'peaked' green and blue die.

Figure 4:
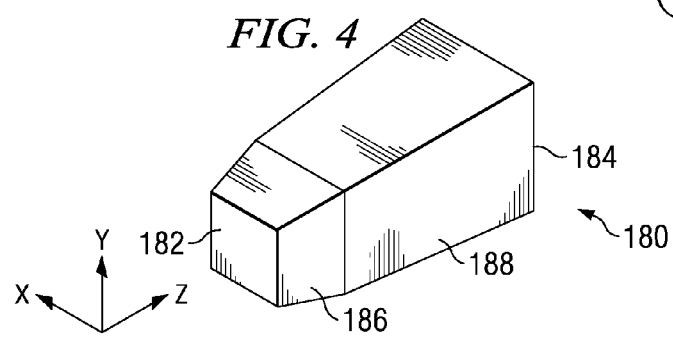
FIG. 4 is a schematic diagram showing a three-dimensional view of an exemplary tapered lightpipe in accordance with the present disclosure.

FIG. 4 is a schematic diagram showing a three-dimensional view of an exemplary tapered lightpipe 180. The tapered lightpipe 180 provides an angle-to-angle transformer intended to reduce the collected angular distribution from an LED source with non-uniform angular output, while maintaining a high transfer efficiency. Generally, tapered lightpipe 180 has a light source input end 182 and a light source output end 184. In this example, the lightpipe 180 has a dual taper in the y-z plane, such that the first and second tapered stages 186 and 188 decrease in cross-sectional area along an axis normal to the cross-sectional plane (z axis), with the first tapered stage 186 decreasing in cross-sectional area per unit length at a greater rate than the second tapered stage 188 decreases.

In this example, lightpipe 180 transforms LED output angles up to 53 degrees to output angles of 23 degrees or less. In the orthogonal dimension (x), the lightpipe is not tapered (although it could be in other embodiments), and LED output angle of 23 degrees or less are output into a cone of 23 degrees or less. These angles were selected such that substantially all of the die face could emit light into the collection system, and the output of the lightpipe 180 would match the étendue of a selected panel. The tapered light pipe 180, in this example, collects 1.5 to 1.75 times more light into the desired étendue than if an étendue-reducing aperture were placed at the die face. In other embodiments, the angle-to-angle transformer can also be implemented with a tapered lightpipe/tunnel and CPC for higher efficiency. A lens at the output of the angle-to-angle transformer may further increase efficiency.

Figure 5A:
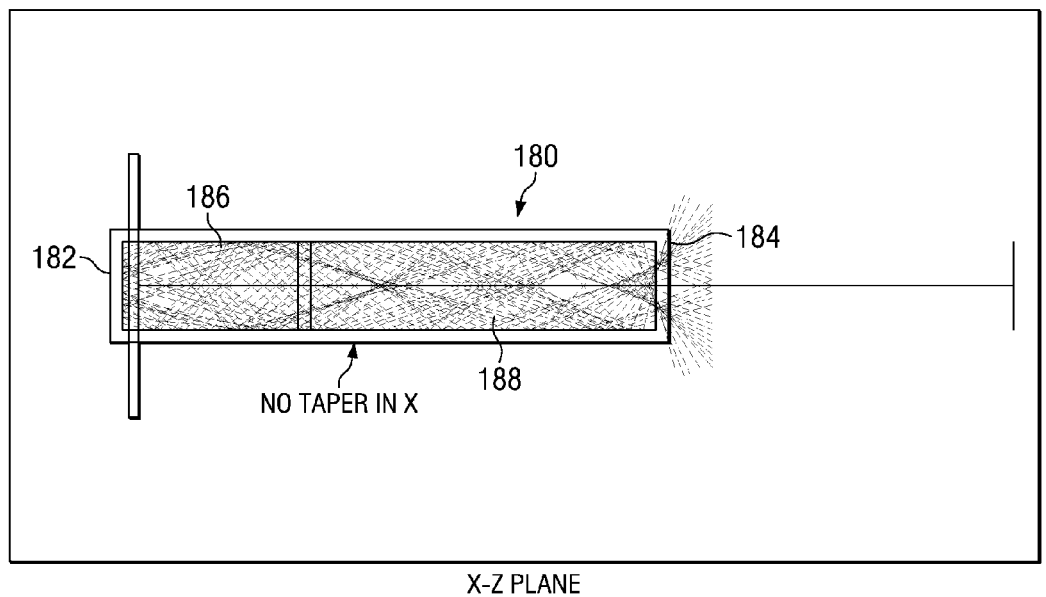
FIG. 5A is a schematic diagram showing a top view of the exemplary tapered lightpipe of FIG. 4.

FIG. 5A is a schematic diagram showing a top view of the exemplary tapered lightpipe 180 of FIG. 4. From this view, it can be seen that the exemplary tapered lightpipe 180 is not tapered in the x-z plane. Although an exemplary tapered lightpipe is herein disclosed that is tapered in one dimension and not another, in other embodiments, the lightpipe may be tapered in other combinations of dimensions. For example, there may be a taper in the x-z plane.

Figure 5B:
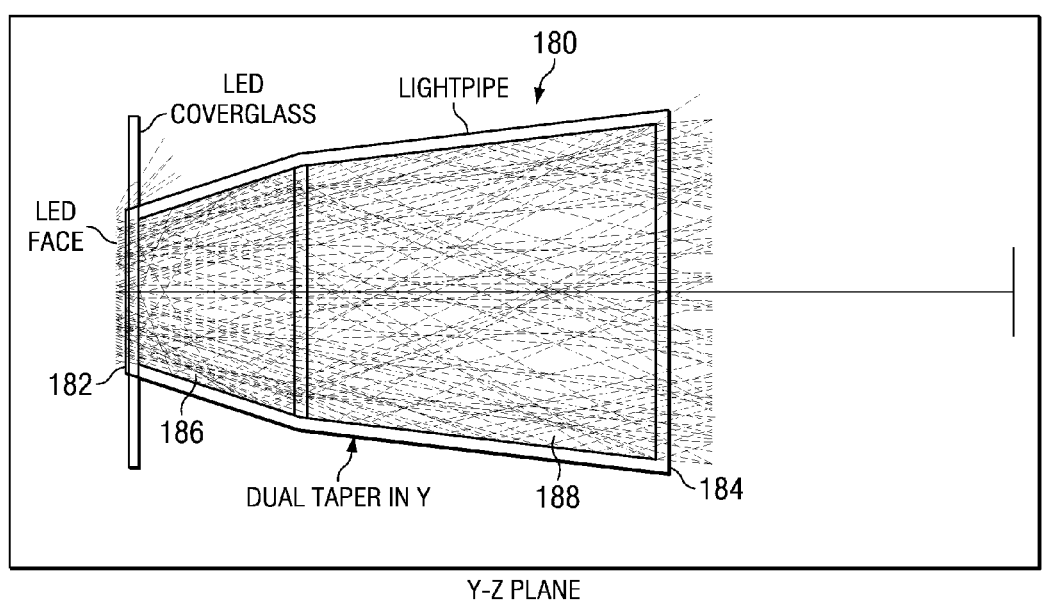
FIG. 5B is a schematic diagram showing a side view of the exemplary tapered lightpipe of FIG. 4.

FIG. 5B is a schematic diagram showing a side view of the exemplary lightpipe 180 of FIG. 4.

Figure 6A:
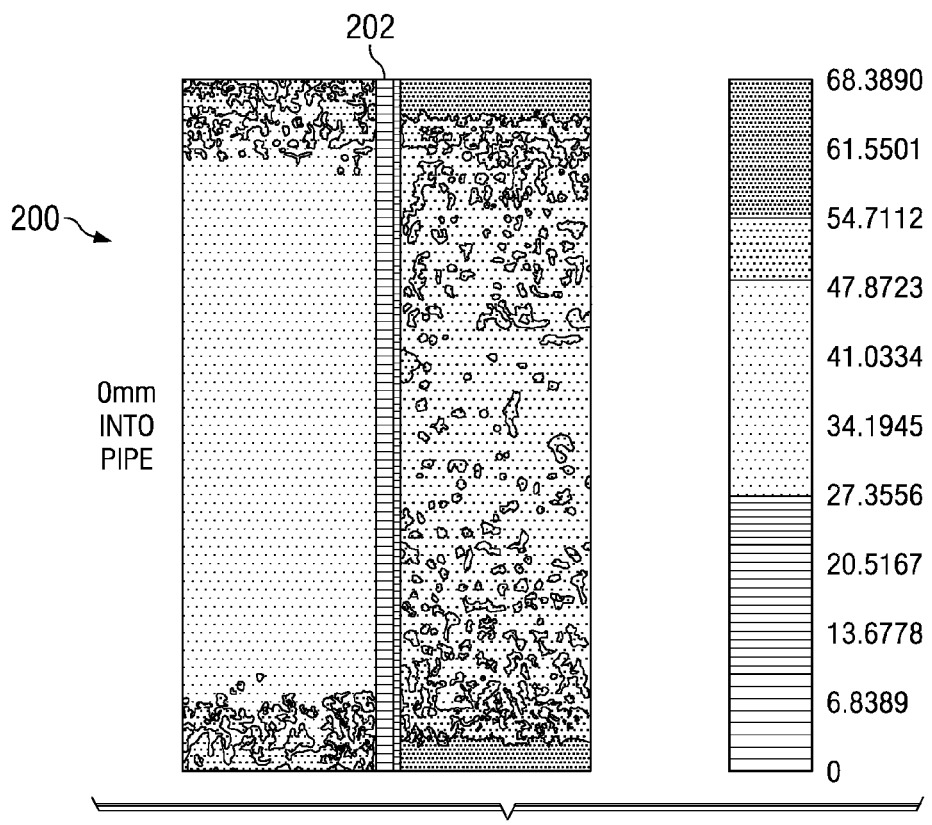
FIG. 6A is a graph illustrating cross-sectional illuminance through the output lightpipe of FIG. 1 at a position of 0 mm along the optical axis, in accordance with the present disclosure.
Figure 6B:
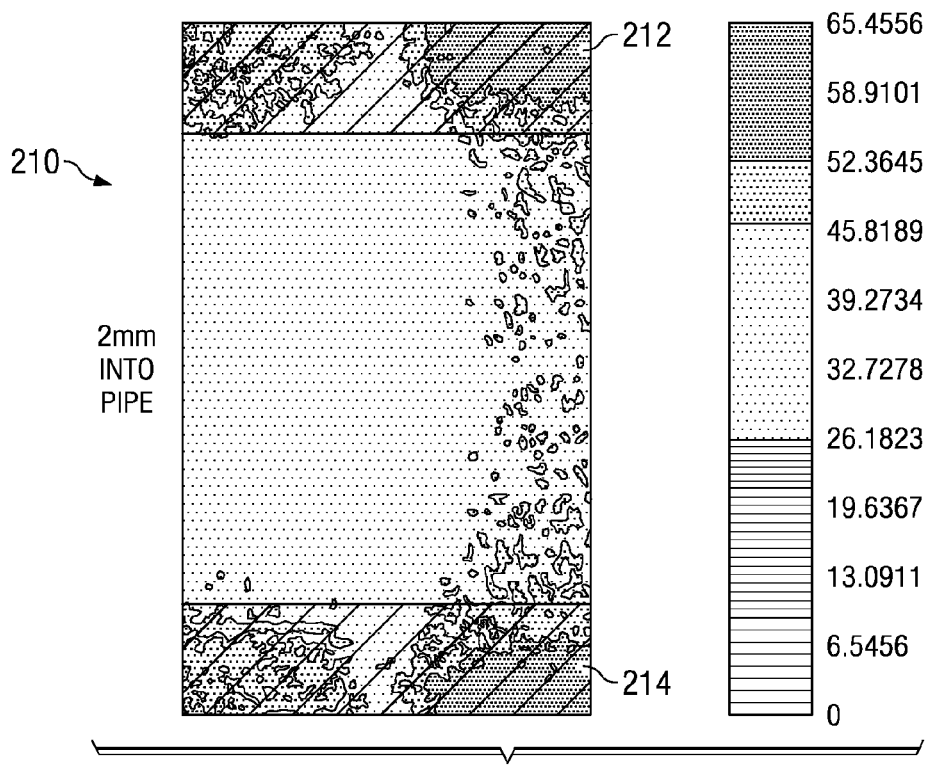
FIG. 6B is a graph illustrating cross-sectional illuminance through the output lightpipe of FIG. 1 at a position of 0 mm along the optical axis, in accordance with the present disclosure.
Figure 6C:
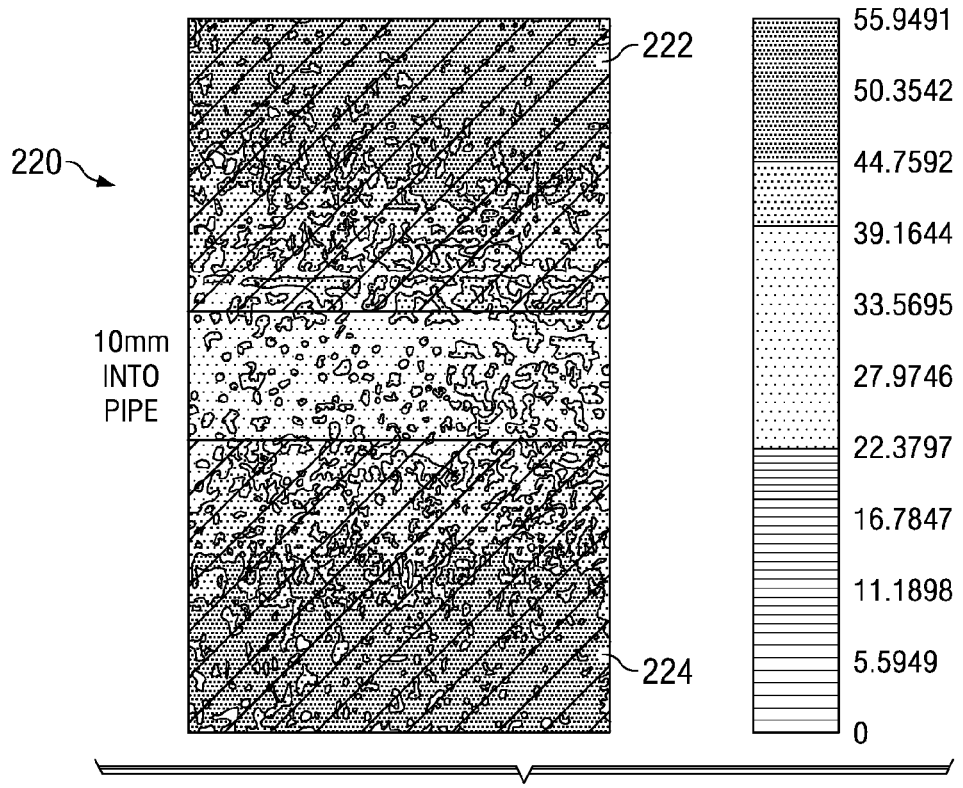
FIG. 6C is a graph illustrating cross-sectional illuminance through the output lightpipe of FIG. 1 at a position of 0 mm along the optical axis, in accordance with the present disclosure.
Figure 6D:
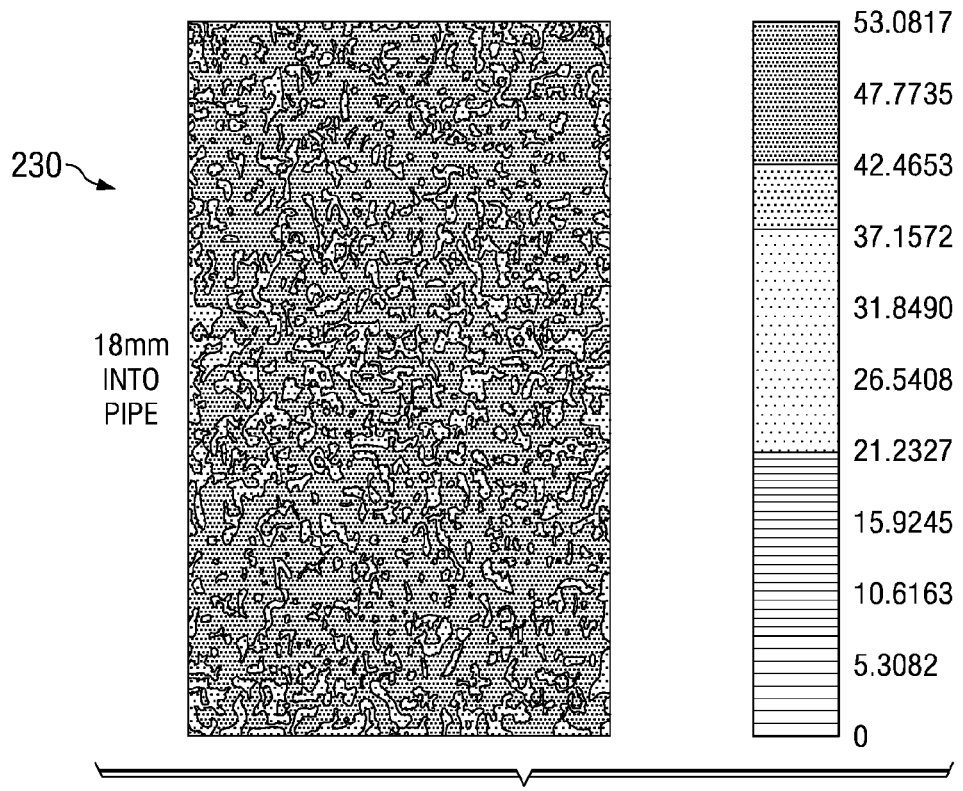
FIG. 6D is a graph illustrating cross-sectional illuminance through the output lightpipe of FIG. 1 at a position of 0 mm along the optical axis, in accordance with the present disclosure.

FIGS. 6A-6D depict cross-sectional illuminance plots 200, 210, 220, 230 through the output lightpipe 124 (of FIG. 1) as a function of position along the optical axis. The light in the lightpipe 124 has been properly scaled for losses that are expected to be incurred during passage through the PBS and reflecting element (right angle prism structure). FIG. 6A illustrates that at a 0 mm position along the optical axis (i.e., at the input of the output lightpipe 124), a shaded area 202 is evident where the half-wave plate is located between the PBS and reflecting element. FIGS. 6B and 6C show that further into the output lightpipe, for instance at 2 mm and 10 mm from the input face in the direction of the optic axis, the HWP shading is reduced, but light pooling is apparent along two edges (e.g., shown by shaded areas 212, 214 in FIG. 6B, and shaded areas 222, 224 in FIG. 6C). FIG. 6D shows that at approximately 18mm from the input of the output lightpipe, the light is homogenized sufficiently for use in projection applications. In other embodiments, the output lightpipe may alternatively be implemented as a dual tapered lightpipe or tapered lightpipe with a compound parabolic concentrator (CPC) for the purpose of implementing lower f-number relay optics. A lens at the output of the angle-to-angle transformer may further increase efficiency.

Figure 7:
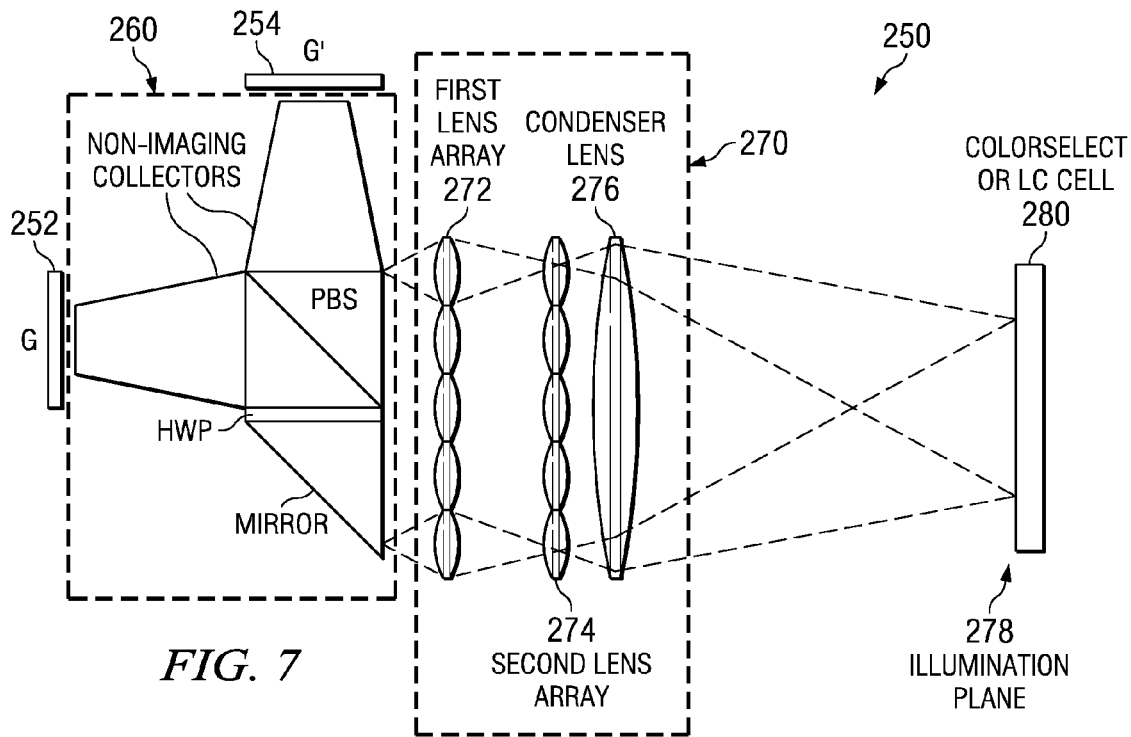
FIG. 7 is a schematic diagram illustrating a second embodiment of a light collection system, including lens arrays and condenser homogenizing optics, in accordance with the present disclosure.

FIG. 7 illustrates a second exemplary embodiment of a light collection system 250, including light collection module 260 and homogenizing optical module 270. Light collection module 260 receives light from first and second light sources 252, 254, and may have similar structure, and may operate in much the same way as elements 102-122 of FIG. 1. Homogenizing optical module 270 generally provides homogenizing optics, and includes first lens array 272 and second lens array 274 (each with two or more lenslets) and a condenser lens 276. The images of each lenslet in the first lens array 272 may be imaged by the second lens array 274 and condenser 276 at the illumination plane 278. The overlapping images provide substantially uniform light at the illumination plane 278. In an embodiment, a ColorSelect filter 280 may be placed in the lens train to rotate all of the light to one common polarization. In another embodiment involving the temporal switching of first and second light sources 252, 254, the ColorSelect filter 280 can be substituted for an LC cell (a switchable half-wave rotator) to provide output light with a common polarization. Such an exemplary embodiment is described in FIG. 14, however, the switching technique described for that embodiment may be used with this architecture also.

Figure 8:
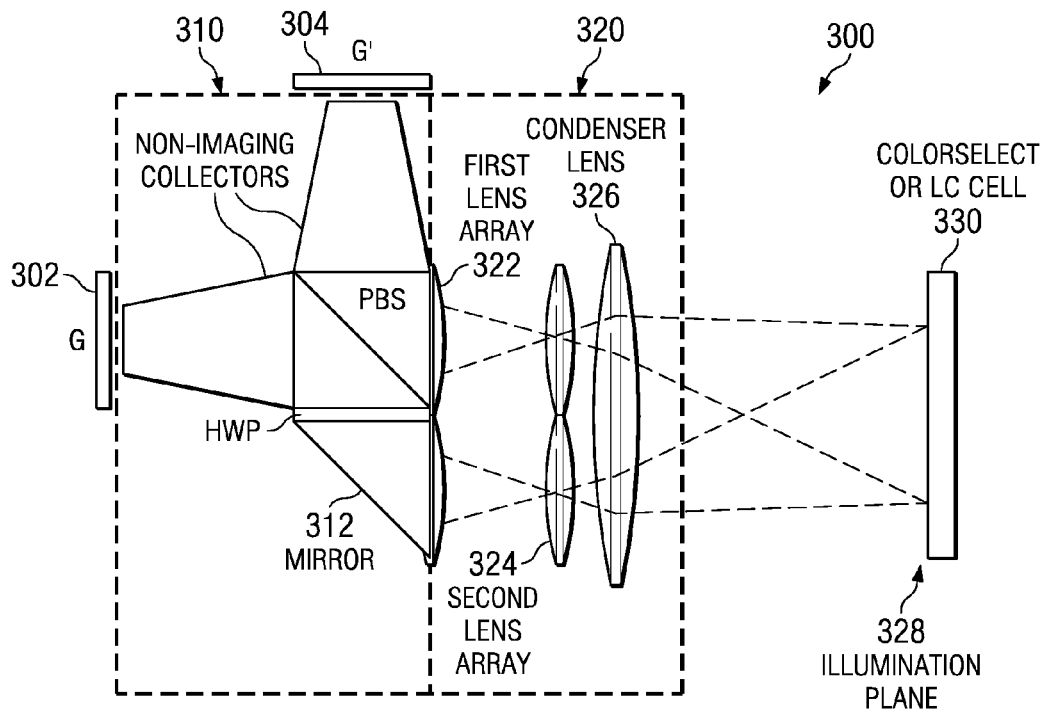
FIG. 8 is a schematic diagram illustrating a third embodiment of a light collection system, including lens arrays and condenser homogenizing optics with a first lens array attached to a prism assembly, in accordance with the present disclosure.

FIG. 8 illustrates a third exemplary embodiment of a light collection system 300, including light collection module 310 and homogenizing optical module 320. Here, the structure and function of light collection module 310 is similar to that shown by the first embodiment described with reference to FIG. 1. In this exemplary embodiment, homogenizing optical module 320 provides a first lens array 322 attached to the face of the prism assembly 312 and also attached to output port of PBS 314 with low index adhesive to optimize total internal reflection (TIR) of light. First lens array 322, in conjunction with second lens array 324 and condenser lens 326 directs light toward illumination plane 328. A ColorSelect element 330 may be placed in the lens train to rotate all of the light to one common polarization. If the lens elements 322-326 have low birefringence, this embodiment may provide the advantage of higher polarization purity at the output compared to the lightpipe homogenizing optic 124 shown in FIG. 1. In another embodiment involving the temporal switching of first and second light sources 302, 304, the ColorSelect filter 330 can be substituted for an LC cell (a switchable half-wave rotator) to provide output light with a common polarization. Such an exemplary embodiment is described in FIG. 14, however, the switching technique described for that embodiment may be used with this architecture also.

Figure 9:
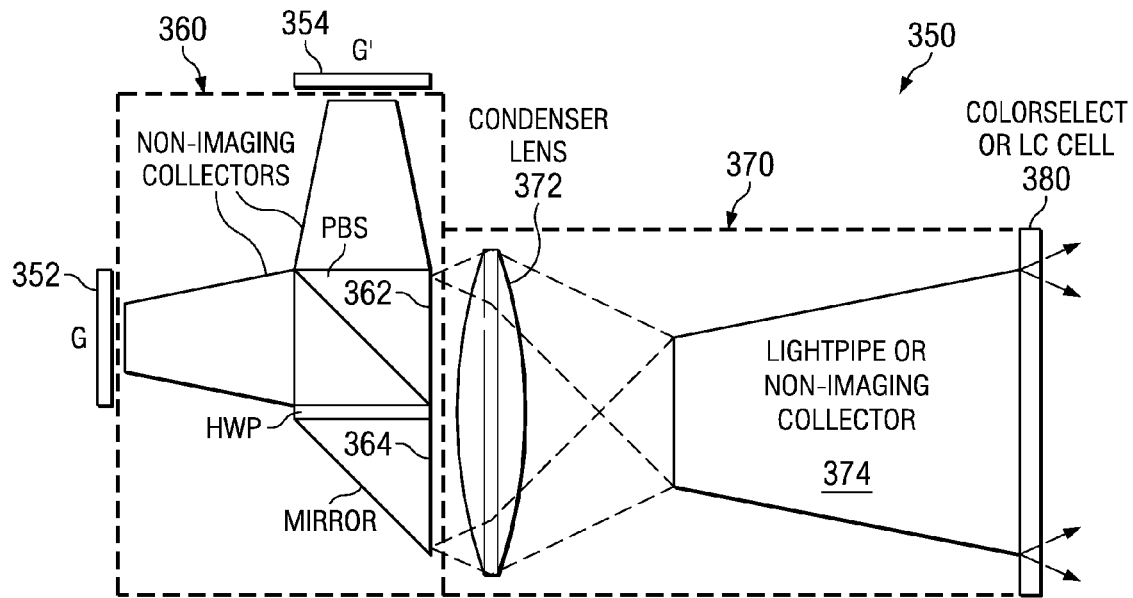
FIG. 9 is a schematic diagram illustrating a fourth embodiment of a light collection system, including a condenser lens and a non-imaging collector as the homogenizing optic, in accordance with the present disclosure.

FIG. 9 illustrates a fourth exemplary embodiment of a light collection system 350, including light collection module 360 and homogenizing optical module 370. The structure and function of light collection module 360 is similar to that shown by the first embodiment described with reference to FIG. 1. The homogenizing optical module 370 includes a condenser lens 372 and lightpipe 374 (or similar non-imaging collector such as a light tunnel, solid Compound Parabolic Concentrator (CPC), hollow CPC, solid angle-angle transformer, or hollow angle-angle transformer) acting as the homogenizing optic.

In operation, light collection module 360 receives light from first and second light sources 352, 354, and directs light toward PBS output port 362 and prism output port 364, in a similar manner to the embodiment described in FIG. 1. The condenser lens 372 directs light from the output of the light collection module 360 to the input of the non-imaging collector 370, where the light is homogenized. In other embodiments, the angular distribution of the illumination may be tailored to match a desired relay lens numerical aperture by tapering or shaping the non-imaging collector 374. In this embodiment, the condenser lens 372 is shown with an air gap between the lens and prism assembly. However, in other embodiments, the condenser lens 372 may alternatively be optically coupled to the prism assembly with low index adhesive. In another embodiment involving the temporal switching of first and second light sources 352, 354, the ColorSelect filter 380 can be substituted for an LC cell (a switchable half-wave rotator) to provide output light with a common polarization. Such an exemplary embodiment is described in FIG. 14, however, the switching technique described for that embodiment may be used with this architecture also.

Figure 10:
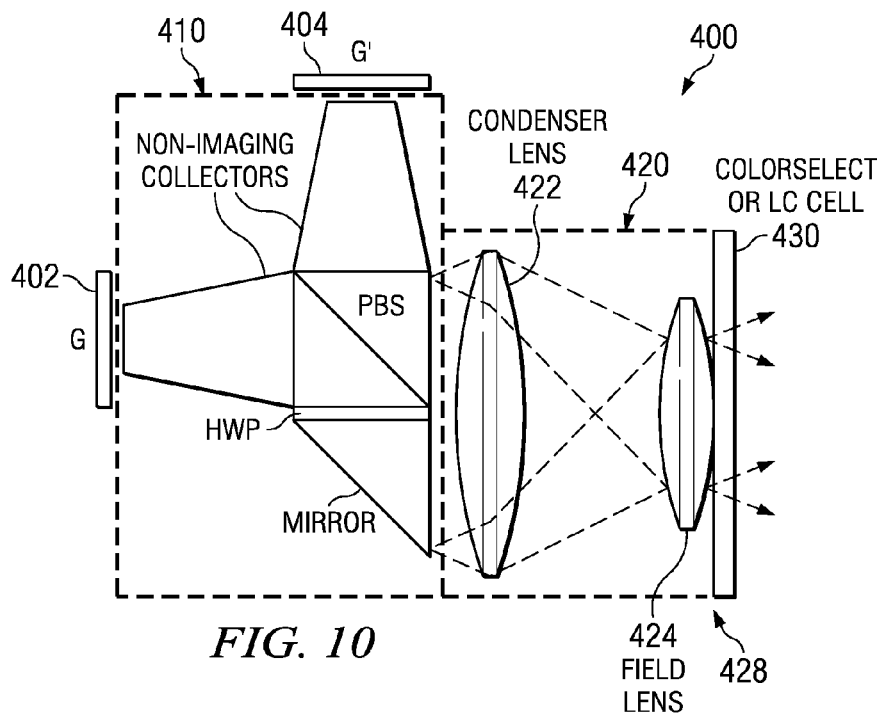
FIG. 10 is a schematic diagram illustrating a fifth embodiment of a light collection system, including a condenser lens and field lens as the homogenizing optic, in accordance with the present disclosure.

FIG. 10 illustrates a fifth exemplary embodiment of a light collection system 400 configured to receive light from first and second light sources 402, 404, including light collection module 410 and homogenizing optical module 420. The structure and function of light collection module 410 is similar to that shown by the first embodiment described with reference to FIG. 1. Homogenizing optical module 420 includes a condenser lens 422 and field lens 424. The field lens 422 functions to create a telecentric source at the illumination plane 428. In some embodiments, system 400 may utilize several lenses for the condenser lens 422 and field lens 424, respectively. By virtue of using homogenizing optical module 420, light collection system 400 may provide a potentially higher polarization purity than a lightpipe or light tunnel-based system. Again, the condenser lens 422 may be optically coupled light collection module 410 with low index adhesive. In another embodiment involving the temporal switching of first and second light sources 402, 404, the ColorSelect filter 430 can be substituted for an LC cell (a switchable half-wave rotator) to provide output light with a common polarization. Such an exemplary embodiment is described in FIG. 14, however, the switching technique described for that embodiment may be used with this architecture also.

Figure 11:
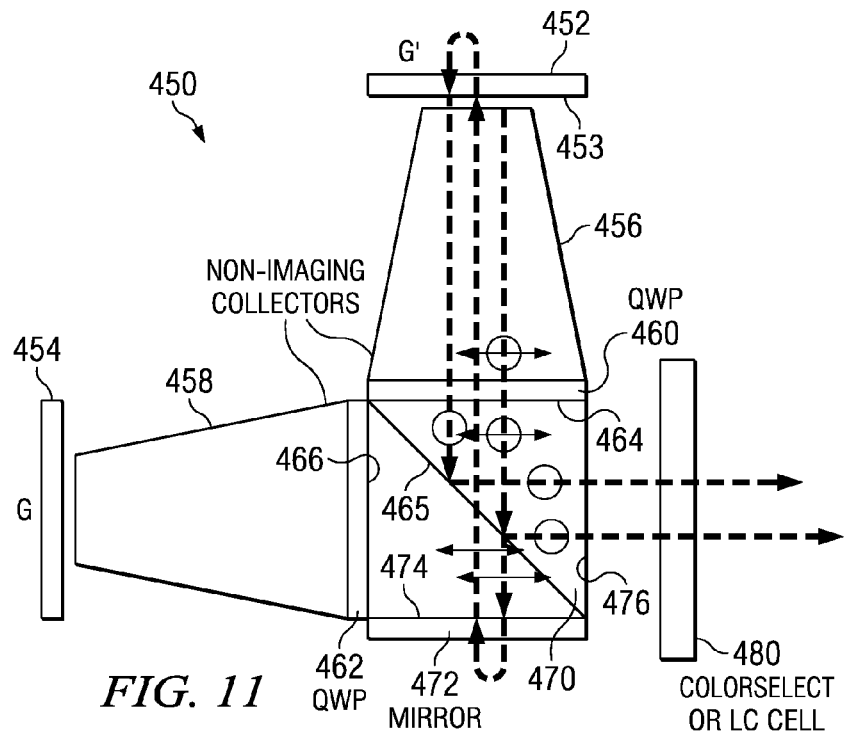
FIG. 11 is a schematic diagram illustrating a sixth embodiment of a light collection system, which provides light recycling, in accordance with the present disclosure.

FIG. 11 illustrates a sixth exemplary embodiment of a light collection system 450, providing an alternative architecture. Light collection system 450 includes first and second light collectors 456, 458 operable to receive light from first and second light sources 452, 454. Light collection system 450 further includes first and second quarter-wave plates (QWP) 460, 462 located between first and second light collectors 456, 458 and first and second input ports 464, 466 of PBS 470. In this exemplary embodiment, a flat mirror 472 is located at port 474 of PBS 470. A ColorSelect element may be located in the output light path transmitted via output port 476 to provide output light with one common polarization. In another embodiment involving the temporal switching of first and second light sources 452, 454, the ColorSelect filter 480 can be substituted for an LC cell (a switchable half-wave rotator) to provide output light with a common polarization. Such an exemplary embodiment is described in FIG. 14, however, the switching technique described for that embodiment may be used with this architecture also.

In operation, randomly-polarized light (G) emitted by first light source 452 is transmitted to the QWP 460 and PBS 470 via the first light collector 456. In the case of light G from the first light source 452, s-polarized light is reflected toward the PBS output port 476, while p-polarized light is transmitted toward the mirror 472. The p-polarized light reflects from the mirror 472, passes through the PBS surface 465, and passes through QWP 460, which transforms the light to a circularly-polarized state. The circular-polarized light reflects again at the surface 453 of the LED 452 (surface reflectivity ~25%), changes handedness, and passes again through the QWP 460. After passing through the QWP 460, this light is now s-polarized, and reflects from the PBS surface 465 toward the PBS output port 476. Illumination from the second light source 452 (G' LED) follows a similar path/recycling, except the s-polarized light is recycled while the p-polarized light is directly transmitted.

In this architecture, the first and second light collectors 456, 458 and PBS 470 can be sized to capture the full panel étendue (compared to half the panel étendue in the previous architectures of FIGS. 1, 7-10). Additionally, the output of the PBS 470 may be directly imaged to the modulating panel since there are no seams in the output face. Finally, polarization purity at the output face 476 of the PBS 470 should be very good.

Figure 12:
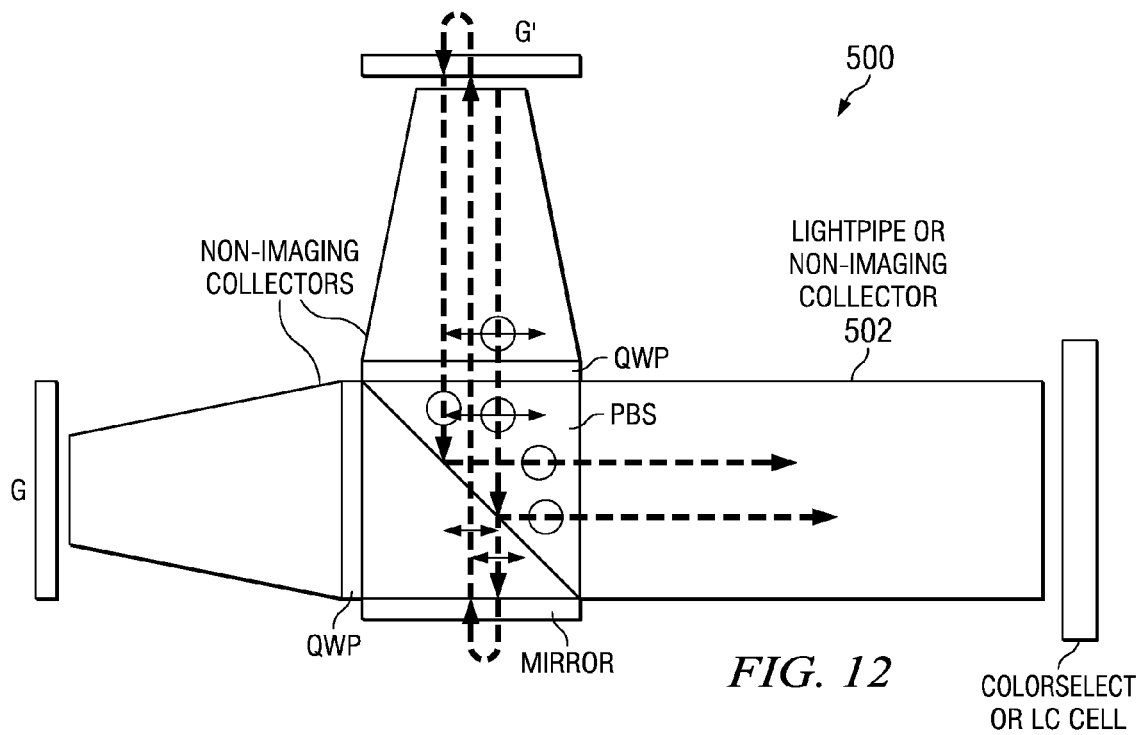
FIG. 12 is a schematic diagram illustrating a seventh embodiment of a light collection system, which provides light recycling with a homogenizing optic at the output, in accordance with the present disclosure.

FIG. 12 illustrates a seventh exemplary embodiment of a light collection system 500. This system 500 has a similar architecture to that shown in FIG. 11, except a lightpipe 502 (or other non-imaging collector such as a light tunnel, solid or hollow CPC, or lens array and condenser) has been added at the output for homogenizing the illumination. The lightpipe 502, or equivalent, may be attached with low index adhesive.

Figure 13:
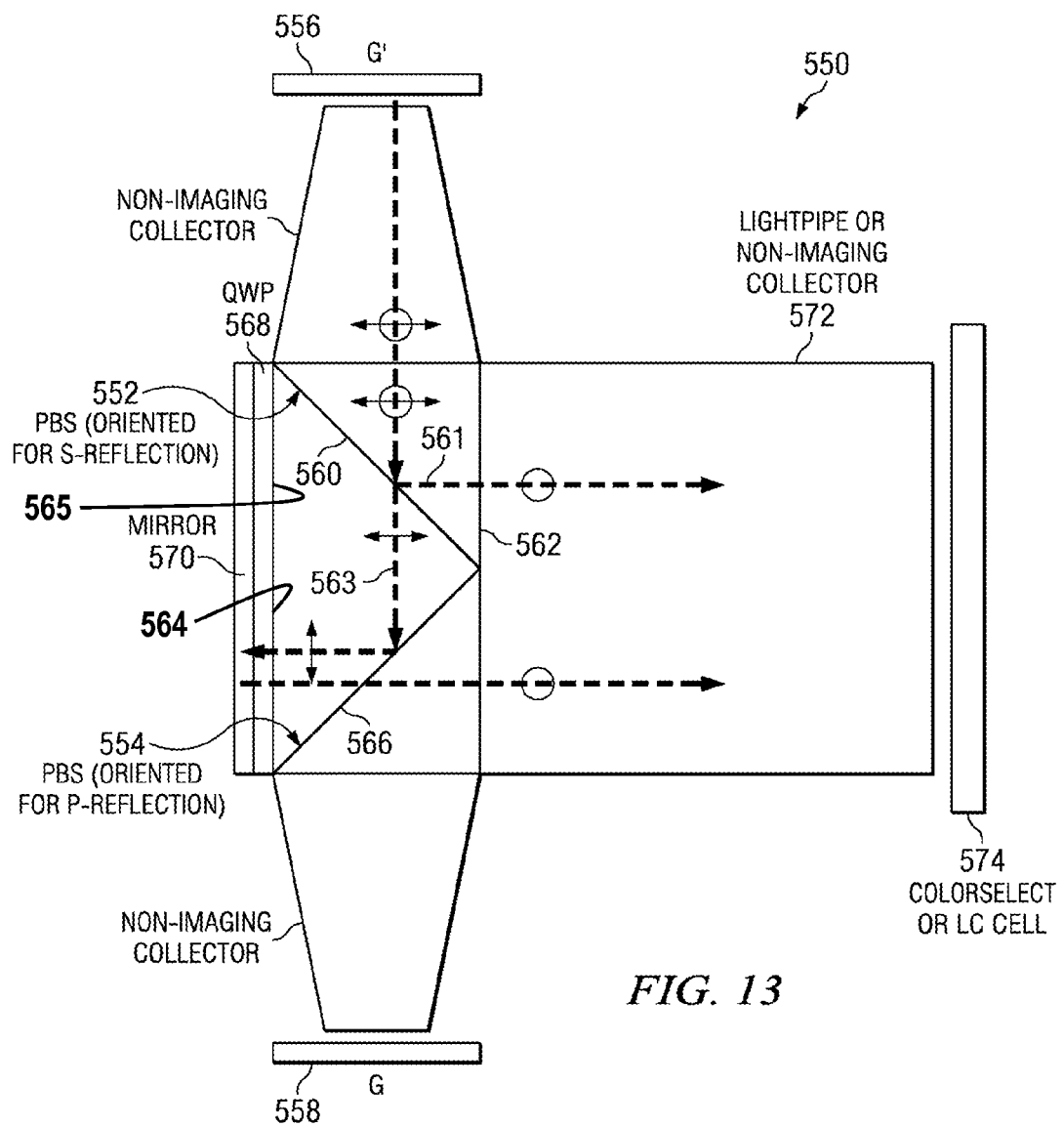
FIG. 13 is a schematic diagram illustrating an eighth embodiment of a light collection system, with a dual PBS structure, in accordance with the present disclosure.

FIG. 13 illustrates an eighth exemplary embodiment of a light collection system 550. This exemplary architecture uses first and second polarizing beamsplitters in orthogonal orientations, where a first PBS 552 reflects s-polarized light and a second PBS 554 reflects p-polarized light. Dual Brightness Enhancement Film (DBEF, from 3M Corp.) is capable of this type of operation.

In this example, randomly polarized light from first light source (G' LED) 556 transmits to the first PBS layer 560, where the s-polarized light 561 is reflected to the output 562 and the p-polarized light 563 is transmitted. The p-polarized light 563 then reflects at the second PBS layer 566, and is converted to circularly-polarized light after passing through the QWP 568. The QWP 568 is adjacent to the first and second polarization manipulating ports 564, 565 and the mirror 570 is adjacent to the QWP 568. The circularly-polarized light changes handedness at the mirror 570, and is converted to s-polarized light after passing through the QWP 568 again. The s-polarized light then transmits through the PBS to the output 562. A lightpipe 572 (or other homogenizing optical structure) is included at the output 562 to provide uniform illumination. The lightpipe 572 may also be attached with low index adhesive. Randomly polarized light from second light source (G LED) 558 is processed in much the same way as that from the first light source, except p-polarized light is reflected at the second PBS layer 566 to the output 562 and the s-polarized light is transmitted. A ColorSelect element may be located in the output light path to provide output light with one common polarization. In another embodiment involving the temporal switching of first and second light sources 556, 558, the ColorSelect filter 574 can be substituted for an LC cell (a switchable half-wave rotator) to provide output light with a common polarization. Such an exemplary embodiment is described in FIG. 14, however, the switching technique described for that embodiment may be used with this architecture also.

Double Brightness Illuminator

The instantaneous light flux output by a light emitting diode (LED) is nearly linearly dependent on the instantaneous current input to the device. LED's can be driven with continuous wave (CW) currents, or can be pulsed with higher peak currents when the current is modulated over short periods of time (fractions of a second). LED manufacturers provide maximum pulsed and CW current limits for their products which produce device lifetimes (usually 20,000-100,000 hours) that are similar for either drive method. In general, the average light flux produced by an LED that is pulsed at the manufacturer's limit pulse current over a long period of time is not greater than the average light flux produced by an LED driven with the manufacturer's limit CW current. For a single LED, this implies the brightest light output will generally be seen with a CW driven LED.

Figure 14:
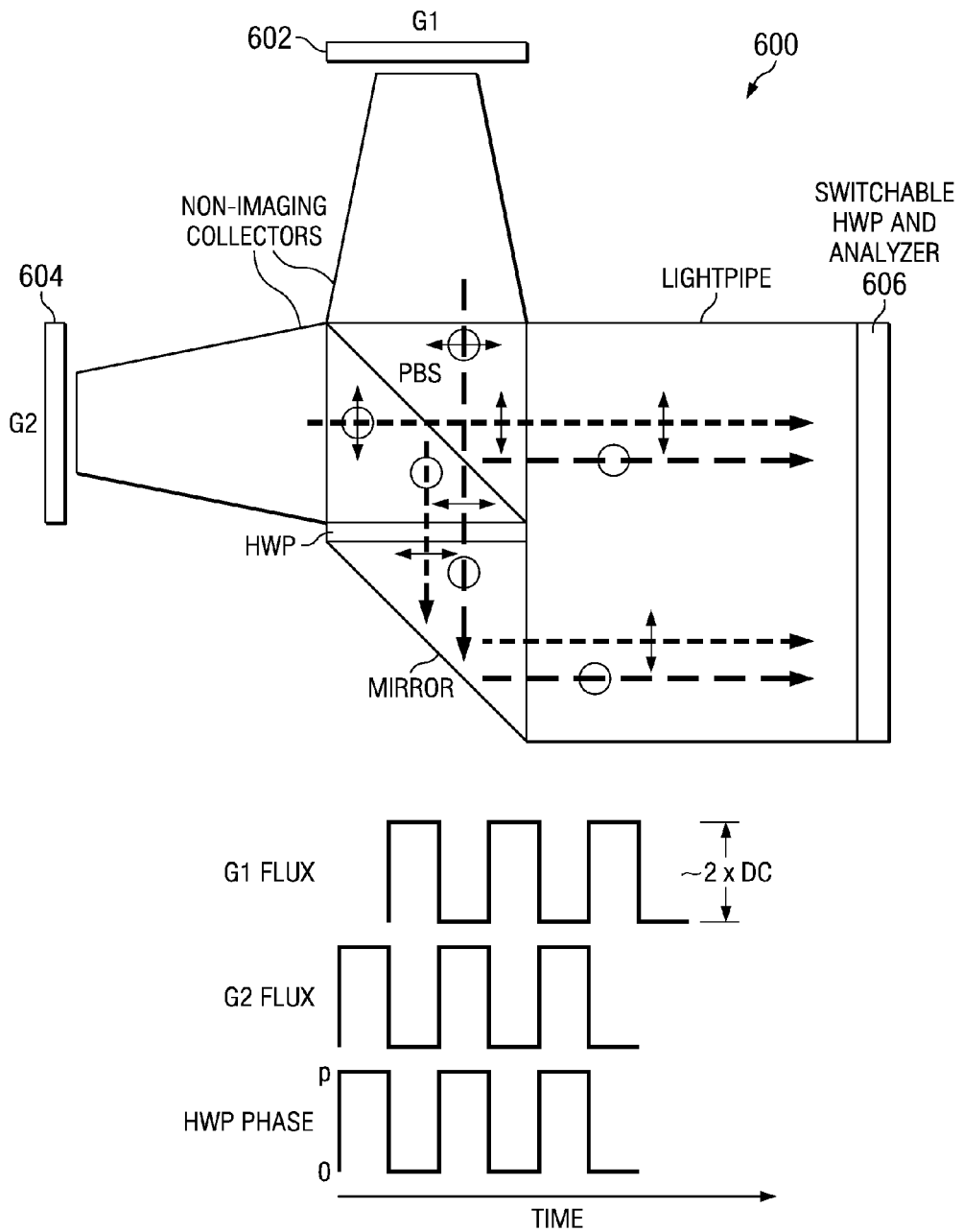
FIG. 14 is a schematic diagram illustrating a ninth embodiment of a light collection system, in accordance with the present disclosure.

FIG. 14 illustrates a variation of a non-imaging light collection system (compared to the various embodiments of FIGS. 1-13) that approximately doubles the brightness of the same system when compared to a single color LED input. The structure of light collection system 600 is similar to the light collection system 100 of FIG. 1, with a few modifications. For instance, in this embodiment, first and second light sources (LEDs) 602, 604 are of the same color (or similar color), and the ColorSelect filter shown in FIG. 1 is replaced with a switchable half-wave rotator (e.g., a liquid crystal cell) and analyzer 606.

FIGS. 1-13 show, among other things, that the use of two substantially distinct colors (or spectral distributions) at the inputs of the light collectors and a ColorSelect device at the output, produce a brighter light source. If the LEDs are replaced with LEDs of the same color (or similar color) 602, 604, and the ColorSelect filter is replaced with a switchable half-wave rotator (e.g., a liquid crystal cell) and analyzer 606, light from either light source 602, 604 can be selected at the output based on the driven phase of the half wave rotator 606. Additionally, if the LEDs 602, 604 are driven with pulsed currents that are approximately 1/(duty cycle) greater than the CW current limit, and the rotator 606 is switched in synchronization with each of the LED driver currents, allowing the LED light to pass through the analyzer in each instance, then the average light flux out of the illuminator can be approximately twice the CW output of a single LED source.

In some embodiments, the same system can be applied to sources that are spectrally separated by an amount less than the sum of half the bandwidths of each source. For example, a bluish green LED might be combined with a yellowish green LED to produce a bright green source in a 2D display. The same illuminator could then be combined with a higher frame rate display for displaying two images in spectral-division 3D applications.

The light collection systems described herein may be implemented as a monolithic glass, plastic, or combination glass/plastic assembly. Total internal reflection (TIR) is required at several faces of the PBS and right angle prism to maintain étendue and efficiency as light travels through the structure. In order to maintain TIR prior folds in the optical path, high index glass (e.g. n=1.78) may be used with a low index glue (e.g. n=1.51) to maintain TIR along the desired surfaces. Alternatively, dielectric layers on the glass surfaces may allow lower index glass or plastic to be used with glue to maintain the TIR. The monolithic assembly provides advantages in robustness, alignment, and potentially cost if components can be molded from plastic.

It should be noted that the tapered lightpipes of FIG. 1 may be utilized to interface LED sources with the color combining and polarization splitting architectures described in U.S. Pub. App. No. 2006/0007538 A1, by M. G. Robinson, entitled "Illumination Systems," filed Jul. 6, 2005, which is hereby incorporated by reference. Furthermore, the output lightpipes may be used to direct light from the output ports of the PBSs/mirrors shown in 2006/0007538 in accordance with the teachings of this disclosure, in order to homogenize output light. The teachings of this disclosure and 2006/0007538 may be combined to provide various light collection systems for projection systems. As used herein, the term "projection system" refers to a display that projects an image onto a screen, including rear-projection systems and front-projection systems.

As used herein, the term "optically coupled" refers to the coupling of optical components to provide a light path and light transmission from one component to another. Optical components may be integrated with other optical components into a single, monolithic glass, plastic or combination glass/plastic assembly, yet functionally those optical components may still be "optically coupled." Optical coupling may include direct or indirect contact between components, and may or may not include the use of index-matching material, including but not limited to index matching adhesive to couple components together. For example, components may be optically coupled when they are touching, when they are integrated as a single assembly, when there is a translucent object between components, and/or when there is a gap between them, provided that a light path is provided between one component and another.

It will be appreciated by those of ordinary skill in the art that the teachings herein can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An apparatus for a projection system, comprising:
a first lightpipe operable to receive light from a first light source;
a second lightpipe operable to receive light from a second light source;
a first polarization beam splitter having a first input port, a first polarization manipulating port, and a first output port, wherein the first input port is optically coupled to the first lightpipe;
a second polarization beam splitter having a second input port, a second polarization manipulating port, and a second output port, wherein the second input port is optically coupled to the second lightpipe;

a quarter-wave plate adjacent the first and second polarization manipulating ports;
a reflecting element adjacent the quarter-wave plate; and
an output light pipe operable to collect light from the first and second output ports.

2. An apparatus according to claim 1, wherein the first and second polarization beam splitters are a single optical component.

3. An apparatus according to claim 1, wherein the first and second polarization beam splitters are packaged in separate optical components and are optically coupled together with an index-matching material.

4. An apparatus according to claim 1, wherein a first beam splitting interface of the first polarization beam splitter is oriented orthogonal to a second beam splitting interface of the second polarization beam splitter.

5. An apparatus according to claim 1, wherein the first beam splitting interface is operable to reflect s-polarized light from the first input port toward the first output port and transmit p-polarized light toward the second polarization beam splitting interface, and the second beam splitting interface is operable to reflect p-polarized light toward the second polarization manipulating port.

6. An apparatus according to claim 1, wherein the second beam splitting interface is operable to reflect p-polarized light from the second input port toward the first output port and transmit s-polarized light toward the first polarization beam splitting interface, and the first beam splitting interface is operable to reflect s-polarized light toward the first polarization manipulating port.

7. An apparatus according to claim 1, further comprising a wavelength selective retarder stack filter located in a light path exiting the output lightpipe, the wavelength selective retarder stack filter being operable to polarize an additive color spectrum along a first axis and its compliment color spectrum along a second axis.

8. An apparatus according to claim 1, further comprising a switchable half wave rotator located in a light path exiting the output lightpipe.

9. An apparatus according to claim 8, wherein the first and second light sources output a substantially similar color spectrum, wherein the first light source has a duty cycle that is substantially the inverse of the second light source duty cycle.

10. An apparatus according to claim 8, wherein light from the first light source and the second light source are selected based on the driven phase of the half wave rotator.

11. A light collector for a projection system, comprising:
a first lightpipe operable to receive light from a first light source;
a second lightpipe operable to receive light from a second light source;
a first polarization beam splitter having a first input port, a first polarization manipulating port, and a first output port, wherein the first input port is optically coupled to the first lightpipe;
a second polarization beam splitter having a second input port, a second polarization manipulating port, and a second output port, wherein the second input port is optically coupled to the second lightpipe;
a quarter-wave plate adjacent the first and second polarization manipulating ports;
a reflecting element adjacent the quarter-wave plate; and
an output light pipe operable to collect light from the first and second output ports; and
a wavelength selective retarder stack filter located in a light path exiting the output lightpipe, the wavelength selective retarder stack filter being operable to polarize an additive color spectrum along a first axis and its compliment color spectrum along a second axis.

12. An apparatus according to claim 11, wherein the first and second polarization beam splitters are a single optical component.

13. An apparatus according to claim 11, wherein the first and second polarization beam splitters are packaged in separate optical components and are optically coupled together with an index-matching material.

14. An apparatus according to claim 11, wherein a first beam splitting interface of the first polarization beam splitter is oriented orthogonal to a second beam splitting interface of the second polarization beam splitter.

15. An apparatus according to claim 11, wherein the first beam splitting interface is operable to reflect s-polarized light from the first input port toward the first output port and transmit p-polarized light toward the second polarization beam splitting interface, and the second beam splitting interface is operable to reflect p-polarized light toward the second polarization manipulating port.

16. An apparatus according to claim 11, wherein the second beam splitting interface is operable to reflect p-polarized light from the second input port toward the first output port and transmit s-polarized light toward the first polarization beam splitting interface, and the first beam splitting interface is operable to reflect s-polarized light toward the first polarization manipulating port.

17. A light collector for a projection system, comprising:
a first lightpipe operable to receive light from a first light source;
a second lightpipe operable to receive light from a second light source;
a first polarization beam splitter having a first input port, a first polarization manipulating port, and a first output port, wherein the first input port is optically coupled to the first lightpipe;
a second polarization beam splitter having a second input port, a second polarization manipulating port, and a second output port, wherein the second input port is optically coupled to the second lightpipe;
a quarter-wave plate adjacent the first and second polarization manipulating ports; a reflecting element adjacent the quarter-wave plate; and
an output light pipe operable to collect light from the first and second output ports; and
a switchable half wave rotator located in a light path exiting the output lightpipe.

18. An apparatus according to claim 17, wherein the first and second light sources output a substantially similar color spectrum, wherein the first light source has a duty cycle that is substantially the inverse of the second light source duty cycle.

19. An apparatus according to claim 17, wherein light from the first light source and the second light source are selected based on the driven phase of the half wave rotator.

* * * * *